United States Patent [19]

McNeel

[11] 4,117,449
[45] Sep. 26, 1978

[54] FLUID RESISTANT GEOPHONE AND CABLE ENCLOSURE

[75] Inventor: William O. McNeel, Houston, Tex.

[73] Assignee: Geo Space Corporation, Houston, Tex.

[21] Appl. No.: 823,755

[22] Filed: Aug. 11, 1977

[51] Int. Cl.² .............................................. G01V 1/16
[52] U.S. Cl. ................................ 340/17 R; 174/52 R
[58] Field of Search ................... 340/17 R; 174/52 R; 339/106; 220/63 R

[56] References Cited

U.S. PATENT DOCUMENTS

| 2,908,890 | 10/1959 | Campbell et al. | 340/17 R |
| 3,993,859 | 11/1976 | McNeel | 340/17 R |

Primary Examiner—Maynard R. Wilbur
Assistant Examiner—T. M. Blum
Attorney, Agent, or Firm—Daniel J. Meaney, Jr.

[57] ABSTRACT

A rigid, fluid resistant enclosure adapted to encase a geophone electrically connected to a cable including a housing having an open end in and inner walls defining a cavity adapted to receive a geophone encapsulated in a fluid tight membrane or boot, which membrane has a sealing ring located around the top edge of the geophone, the open end of the housing having a counterbore axially aligned with and formed into the cavity terminating in a countersink having inwardly sloping walls defining a sealing surface which communicates with the inner walls of the cavity, a flexible header positioned within the counterbore and countersink of the open end of the housing and two resilient opposed elongated cable entry means having sealing nipples adapted to have a cable extended therethrough into a hollowed out central area which is to be electrically connected to the geophone and wherein the resilient sealing nipples have a plurality of axially aligned sealing ridges extending around the interior thereof to engage with and seal against the exterior surface of a cable, the flexible header including a sealing collar which extends from the opening into the countersink and counterbore of the housing, a sealing ridge formed between the edge of the opening and interior surface of the collar with the collar terminating in a tapered edge having inwardly sloping walls which engage and seal against the inwardly sloping walls of the countersink of the housing and a circumferentially extending sealing lip located on the interior of the collar below the sealing ridge to engage the exterior surface of the membrane.

14 Claims, 5 Drawing Figures

U.S. Patent   Sept. 26, 1978   4,117,449
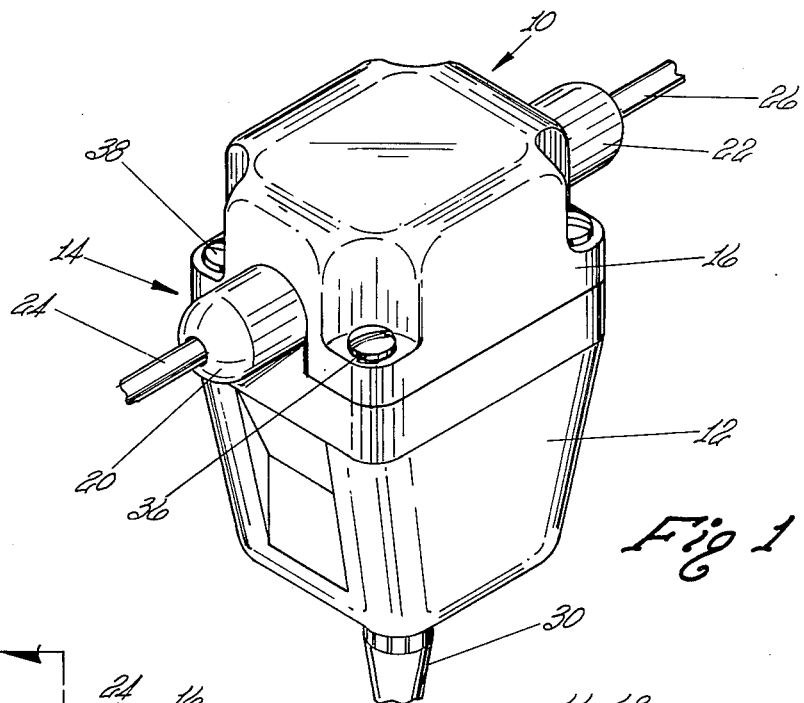
*Fig 1*
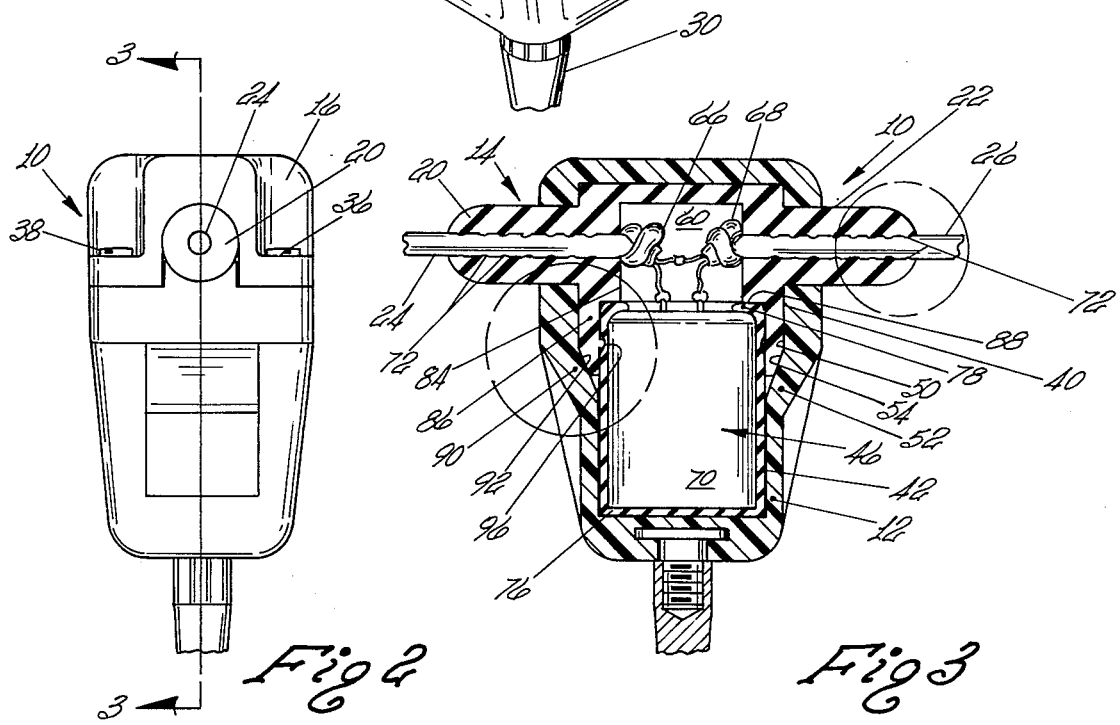
*Fig 2*   *Fig 3*
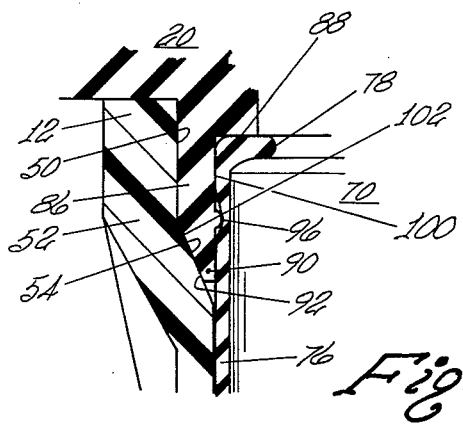
*Fig 4*
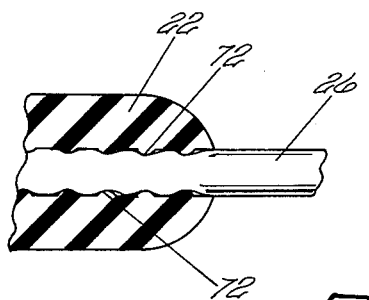
*Fig 5*

FLUID RESISTANT GEOPHONE AND CABLE ENCLOSURE

BACKGROUND OF THE INVENTION

1. Field of the Invention

This invention relates to a new and improved fluid resistant, durable enclosure for a geophone electrically connected to a cable. In particular, this invention relates to a fluid resistant enclosure having a fluid tight interior adapted for use in the seismic industry as a fluid resistant, durable enclosure for enclosing a seismometer for detecting seismic waves produced by a seismic energy source in marshes, swamps and other damp and wet geographical locations.

2. Disclosure of the Prior Art

It is known in the prior art to use a fluid tight, high impact polycarbonate (LEXAN cases) to enclose or house a geophone which is electrically connected to a cable which passes through the case. Use of a knot anchored takeout to prevent withdrawal of the cable from the case and disconnection of the cable from the geophone is known and described in U.S. Pat. No. 3,119,978.

There are a number of other known fluid tight enclosures or fluid resistant enclosures for use with geophone and cable. Typical of the known devices are those described in U.S. Pat. Nos. 2,908,890, 3,445,809 and 3,993,859, the latter which has a common assignee with the present application.

The seismophone and cable assembly described in U.S. Pat. No. 2,908,890 utilizes a housing which functions as a protective case for the components which actually comprise the geophone. The protective case is formed integrally with an interconnecting cable to insure that seismophones and seismophone case will not be damaged by pulling on the interconnecting cable. A cap, which is mounted through a sealing ring to the housing of the protective case, functions both as the top to the seismophone housing and to the protective case.

U.S. Pat. No. 3,445,809 discloses a geophone housing and takeout. The housing is adapted to receive a geophone which is an integral component pre-assembled and adapted to be electrically connected to a cable. The geophone housing of U.S. Pat. No. 3,445,809 includes a rubber geophone takeout which is molded about and affixed to a cable carrying electrical conductors. The takeout terminates in a molded rubber cup having the frustro-conical surface, the interior of which encloses and directly engages the exterior of the geophone without anything therebetween. A top cooperates with the housing and the molded takeout, attached to the electrical cable, to form a fluid tight housing relying primarily on the integral relationship between the molded takeout and the cable and the seal formed between the exterior of the molded takeout and the top and housing.

U.S. Pat. No. 3,993,859 discloses a fluid tight enclosure for geophone and cable having a flexible header and stress ring. The flexible header is removably affixed to a cable. The stress ring is located within the flexible header and cooperates with an annular shaped ring member, which is integral with the flexible header, for forming a fluid tight seal between the annular shaped ring member and top of the geophone and between the housing, cable supports, and the cable. The stress ring is capable of retaining a cable, having a knot anchored takeout therein, to prevent withdrawal of the cable through the flexible header while concurrently forming a fluid tight seal between the annular shaped ring member and housing.

The prior art cases have several disadvantages. One disadvantage is that, under continuous usage, the fluid tight seal between the plastic housing and top or housing segments may leak. Further, if the case is fabricated from a plastic material, the plastic material itself is subject to deterioration from sunlight and temperature extremes. Also, under certain conditions, the case may become cracked. Fluid could enter through the deteriorated or disrupted seals, case or cracks, to disable the geophone operation. In such event, the fluid would short out or otherwise affect the electrical connections between the electrical cable and geophone. The fluid tight enclosure for geophone and cable described in U.S. Pat. No. 3,993,859 provides a sealing means for keeping the fluid away from the terminals of the geophone which are electrically connected to the cable. However, in the event that the case is cracked or broken, the seal between the stress ring and annular sealing rings will effectively provide an interior seal to inhibit fluid from entering directly into the hollowed out central area of the flexible header. In the event that fluid did enter into the cavity of the housing, the fluid would enclose the geophone housing. Also, under very high pressure, fluid may travel within the interior of the cable, through the cable supports, and enter the hollowed out area of the header, thereby shorting the terminals of the geophone.

SUMMARY OF THE INVENTION

The present invention overcomes several disadvantages of the known prior art. One advantage of the present invention is that a positive fluid resistant waterproof seal is formed between the housing, a flexible header and a top. A plurality of positive fluid tight compression seals are formed between the housing, top and flexible header of the present invention. A geophone is first enclosed with a fluid tight membrane which terminates in a ring positioned around the edge of the top of the geophone. A geophone fitted with a membrane is inserted into the cavity of the housing. A cable is removably inserted through the nipples of the flexible header and knot anchored takeouts are formed in each end of the cable. Thus, positive, fluid tight axial compression seals can be formed between the cable entry nipples and the exterior of the cable insuring a fluid tight seal with the cable.

A fluid tight top compression seal is formed between the header and the fluid tight membrane without a stress ring. In particular, the ring formed around the top of the membrane contacts a sealing ridge of the header and the top of the geophone, forming a fluid tight seal between the top of the geophone, the ring and the header.

A fluid tight lateral compression seal is formed between a circumferential sealing ridge formed around the interior of a collar formed in the flexible header which collar, in turn, encloses the fluid tight membrane. The lateral compression seal is formed by the circumferential sealing ridge engaging the exterior of the fluid type membrane forming the fluid tight seal between the circumferential ridge, the fluid tight membrane, and the exterior case of the geophone. Fluid resistant seals are formed between the mating inwardly shaped sealing edges of the header and housing and between the exterior of the cable entry nipples, the top and the housing.

Another advantage of the present invention is that in the event a case is cracked or otherwise broken, and water or other fluid enters into the interior of the housing, the fluid tight membrane, the flexible header and the top compression seal formed between the header and ring of the fluid tight membrane provide a backup, interior fluid tight seal.

Another advantage of the present invention is that during normal usage, a fluid resistant seal is formed between the header, top and housing to keep fluid or water from the interior of the geophone, thereby insuring the integrity of the fluid resistant enclosure.

Another advantage of the present invention is that the housing is capable of having a threaded base stud support mounted therein, thereby enabling the user to easily interchange the type of mounting spikes or bases without damaging the integrity of the enclosure of the fluid tight seal.

BRIEF DESCRIPTION OF THE DRAWING

The foregoing and other advantages and features of the invention will be apparent from the following description of the preferred embodiment of the invention when considered together with the illustrations in the accompanying drawing and includes the following figures:

FIG. 1 is an isometric view of an assembled fluid resistant enclosure having a cable passing therethrough;

FIG. 2 is a side view of the fluid resistant enclosure shown in FIG. 1;

FIG. 3 is a sectional view of the fluid resistant enclosure taken along section lines 3—3 of FIG. 2;

FIG. 4 is an exploded view, partially in cross section, showing the top compression seal formed between the flexible header and ring of a fluid tight membrane and the lateral compression seal formed between a circumferential ridge of the collar of the header and the fluid tight membrane; and FIG. 5 is an exploded view, partially in cross section, showing the plurality of annular shaped axially aligned ridges formed in the interior of the elongated nipples which form the cable entry means.

Similar numbers refer to similar elements throughout the drawing.

DESCRIPTION OF THE PREFERRED EMBODIMENT

FIG. 1 illustrates a rigid, fluid resistant enclosure adapted to encase a geophone electrically connected to a cable generally shown as 10. The enclosure 10 includes a housing means generally shown as 12, a flexible sealing means generally shown as 14 and a top shown as 16. The flexible sealing means 14 has cable entry means such as, for example, elongated resilient sealing nipples shown as 20 and 22. Sealing nipples 20 and 22 are adapted to have a cable passed therethrough such as cable shown as 24 and 26. The housing means 12 has an exterior support mounting means located at the end thereof, opposite the end which communicates with top 16. The exterior support mounting means is adapted to receive a mounting means such as, for example, a mounting spike 30.

FIG. 2 shows the cable 24 passing into the interior of the housing 12 through the elongated nipple 20. The top 16 is positioned to engage the open end of the housing with the flexible sealing means 14 therebetween. The top has a plurality of apertures 36, shown in FIGS. 1 and 2, which are in alignment with tap apertures in the housing means 12. A plurality of fasteners such as screws 38 are mounted in the apertures of the top and extend into the tap apertures of the housing. The screws 38 are capable of providing a clamping force as the screws are advanced into the tapped apertures to obtain the fluid tight seals as described herein.

FIG. 3 shows, in detail, the relationship between the various components of the enclosure and shows in detail the various compression seals formed within the interior of the enclosure. In particular, the rigid fluid resistant enclosure 10 has a housing means 12 which has an open end 40 and inner walls 42 which define a cavity shown by arrow 46. The open end 40 of housing 12 has a counterbore 50 axially aligned with and formed into the cavity shown by arrow 46. The counterbore 50 terminates in a countersink 52 having inwardly sloping walls 54. The sloping walls 54 define a sealing surface which communicates with the inner walls 42 of the cavity shown by arrow 46.

The flexible sealing means 14 is positioned in the counterbore 50 and countersink 52 of the opened end 40 of the housing means 12. The flexible sealing means 14 has a hollowed out central area 60. The elongated cable entry nipples 20 and 22 are adapted to have the cables, Sections 24 and 26, respectively extended therethrough into the hollowed out central area 60. Each cable section 24 and 26 has a knot anchored takeout, 66 and 68 respectively, formed therein. The volume and geometric dimensions of the hollowed out central area 60 are of sufficient size to enclose the two knot takeout anchors 66 and 68. Electrical conductors within the cable are electrically connected to terminals of a geophone 70.

The elongated resilient sealing nipples 20 and 22 forming the cable entry means have a plurality of raised protrusions 72 formed around the interior thereof to intimately engage the exterior of each of the cable sections 24 and 26.

The geophone 70 is encapsulated in a removable fluid tight membrane 76 which terminates in a ring 78 located at the top of geophone 70.

The flexible sealing means 14 includes means defining an opening 84 to the hollowed out central area 60 located in axial alignment with and spaced a predetermined distance from the counterbore 50 and countersink 52 in the housing 12. In addition, the flexible sealing means 14 defines a sealing collar 86 which extends from the opening 84 into the counterbore 50 and countersink 52 of the housing 12. The flexible sealing means defines a sealing ridge 88 which is formed between the edge of the opening 84 and the interior surface of the collar 86.

The sealing collar 86 terminates in a tapered edge 90 having inwardly sloping walls 92 which mate with and seal against the sealing surface of the inwardly sloping walls 54 of the housing 12.

The interior surface of the sealing collar 86 has a circumferentially extending sealing 96 located on the interior thereof and below the sealing ridge 88. The sealing ridge 88 is adapted to engage the exterior surface of the removable fluid tight membrane 76 which encapsulates the geophone 70.

The clamping means such as fasteners 38 shown in FIG. 1 function to attach the top 16 to the housing 12 and to insure a positive sealing force between the various components as described herein.

FIG. 4 shows in greater detail two of the compression seals. In particular, the membrane 76 terminates in a sealing ring 78 which is located between the sealing ridge 88 defined between opening 84 and the interior surface 100 of sealing collar 86. The outer surface 102 of collar 86 terminates in the tapered edge 90. The circumferential extending sealing lip 96 engages the exterior of the fluid tight membrane 76.

As the clamping means tighten down the top 16 to the housing 12 engaging the flexible header 14, the sealing ridge 88 is urged against the ring 78 of the fluid tight membrane 76 to form a fluid tight compression seal between the ring 78 of fluid tight membrane 76 and the top of the geophone 70. A second compression seal is obtained by urging of the tapered edge 90 of the collar 86 against the inwardly sloping walls 54 of countersink 52. The mating sealing surfaces 54 and 102 form a fluid resistant seal.

Concurrently, the collar 86 is directed toward or against the membrane 76 thereby bringing the circumferential extending lip 96, formed around the interior surface 100 of collar 86, into intimate contact with the exterior surface of the fluid tight membrane 76. The circumferentially extending lip 96 clamps and forms a fluid tight lateral compression seal between the sealing lip 96, the fluid type membrane 76 and the exterior of the geophone 70. Thus, a top compression seal and a lateral compression seal form a fluid tight interior within the fluid resistant enclosure.

FIG. 5 shows the raised protrusions 72 in the elongated resilient sealing nipples 22, forming one of the cable entry means in greater detail. The protrusions are a plurality of co-axially aligned annular shaped sealing ridges which are adapted to intimately removably contact the exterior surface of cable 26 within nipple 22. The annular shaped sealing ridges are substantially half round in shape and are responsive to the clamping means to squeeze said annular shaped sealing ridges into the cable forming a plurality of sequential fluid tight compression seals with the exterior surface of the cable such as with cable 26.

The flexible header 14 may be formed of a material which is resistant to fluid or water to prevent entry thereof through the material into the interior of the header or housing. One example of a material which may be used in practicing the invention is a neoprene compound having hardness of about 55 durometers on the Shore A scale. The fluid tight membrane 76 in the preferred embodiment is formed of a molded neoprene compound. One example of such a neoprene compound is a material having a hardness of about 55 durometers on the Shore A scale.

The fluid tight metal enclosure of the embodiment described herein is capable of use in seismic sensors manufactured by Geo Space Corporation of Houston, Texas. One example of such a seismic sensor is a digital grade geophone generally known as GSC Model 20D Digiphone. The fluid resistant enclosure has utility as a land case or marsh case for use in wet or marshlike environments. Use under water is possible, provided that at least one of the fluid resistant and fluid tight compression seals is capable of withstanding pressures in excess of 14 PSI.

In the event that the fluid resistant enclosures must be disassembled in the field, for example, to replace a defective geophone, the enclosure is field serviceable. In such event, the enclosure can be easily disassembled, the geophone replaced or other items repaired or replaced, and the enclosure reassembled without requiring molding apparatus, potting compounds or special tooling.

What is claimed is:

1. A rigid, fluid resistant enclosure adapted to encase a geophone electrically connected to a cable comprising a housing means having an open end and inner walls defining a cavity adapted to receive a said geophone encapsulated in a removable fluid tight membrane terminating in a sealing ring located around the top edge of the geophone, said open end of the housing means having a counterbore axially aligned with and formed into said cavity terminating in a countersink having inwardly sloping walls defining a sealing surface which communicates with the inner walls of said cavity;

a flexible sealing means positioned in the counterbore and countersink of the open end of the housing means and having a hollowed out central area and cable entry means adapted to have a said cable extended therethrough into the hollowed out central area to be electrically connected to a said geophone, said cable entry means having elongated resilient sealing nipples extending from the hollowed out central area to the exterior of the housing and having a plurality of raised protrusions on the interior thereof to intimately engage the exterior of a said cable, said flexible sealing means including means defining an opening to the hollowed out central area located in axial alignment with and spaced a predetermined distance from said counterbore and countersink of the housing means, a sealing collar which extends from the opening into the countersink and counterbore of the housing means and a sealing ridge formed between the edge of the opening and interior surface of the collar, said sealing collar terminating in a tapered edge having inwardly sloping walls which mate with and seal against the sealing surface of the inwardly sloping walls of the countersink of said housing means and a circumferentially extending sealing lip located on the interior of the collar below the sealing ridge which is adapted to engage the exterior surface of a said removable fluid tight membrane; and means clamping said flexible sealing means into intimate fluid resistant contact with the exterior of said housing means and a fluid tight axial compression seal between the sealing nipples and a said cable extending therethrough, said housing means and said flexible sealing means forming interior fluid tight seals therebetween by urging said sealing ridge of the flexible sealing means against a said ring of a fluid tight membrane to form a fluid tight top compression seal between a said fluid tight membrane and a said geophone top and by urging said tapered edge of the collar against the housing means to form an intimate fluid resistant seal between the mating sloping walls of the countersink and collar, said collar being tightened against a said fluid tight membrane in response to the sealing edges of the countersink and collar making sealing engagement therebetween to direct the circumferential lip formed around the interior of the collar against the exterior surface of a fluid tight membrane to clamp and form a fluid tight lateral compression seal between the sealing lip, a said fluid tight membrane and exterior of a said geophone forming a fluid tight interior within the fluid resistant enclosure.

2. The enclosure of claim 1 wherein said raised protrusions in the interior surface of the elongated nipples are a plurality of annular shaped sealing ridges being adapted to intimately removably contact the exterior surface of a said cable and being responsive to said clamping means to squeeze said annular shaped sealing ridges into a plurality of fluid tight axial compression seals with the exterior surface of a said cable.

3. The enclosure of claim 1 wherein said housing means has an exterior support mounting means formed at the end thereof opposite the end defining the opening to the cavity.

4. The enclosure of claim 1 further comprising said housing means having a plurality of apertures at the open end thereof; and wherein said clamping means comprises:
- a top positioned to engage the open end of the housing with the flexible sealing means therebetween and having a plurality of apertures therein in alignment with the apertures in said housing; and
- a plurality of screws mounted in the apertures of said top and extending into said apertures, said screws being capable of providing a clamping force as said screws are advanced into said apertures.

5. The enclosure of claim 2 wherein the flexible header is formed of a neoprene compound having a hardness of about 55 durometers on the Shore A scale.

6. The enclosure of claim 1 wherein the fluid tight membrane is formed of a molded neoprene compound having a hardness of about 55 durometers on the Shore A scale.

7. A rigid, durable fluid resistant enclosure adapted to encase a geophone electrically connected to a cable comprising
- a housing having an open end, a closed end and inner walls defining an interior cavity for receiving a said geophone encapsulated in a removable fluid tight membrane terminating in a sealing ring located around the top edge of the geophone capable of being inserted therein through the open end, said open end of the housing having a counterbore axially aligned with and extending within the top half of said cavity terminating in a countersink having inwardly sloping walls formed at an arcuate angle relative to the axis of the cavity to define a sealing surface which communicates with the inner walls of said cavity;
- a flexible header positioned in the counterbore and countersink of the open end of the housing and having a hollowed out central area and a pair of elongated resilient nipples extending in opposite directions therefrom and adapted to have a said cable extended therethrough into the hollowed out central area to be electrically connected to said geophone, each of said elongated resilient sealing nipples having a circular cross-section and extending from the hollowed out central area to the exterior of the housing and having a plurality of axially aligned raised sealing ridges on the interior thereof to intimately engage the exterior of a said cable, said flexible header including means defining a circular shaped, axially aligned opening with the hollowed out central area which is located in axial alignment with and spaced a predetermined distance from said counterbore and countersink of the housing, a sealing collar having an interior surface and exterior surface which extends from the opening into the countersink and counterbore of the housing and a sealing ridge formed between the edge of the opening and interior surface of the collar, and sealing collar exterior surface terminating in a tapered edge having inwardly sloping walls which mate with and seal against the sealing surface of the inwardly sloping walls of the countersink of said housing and a circumferentially extending sealing lip located on the interior surface of and within the lower half of the collar and positioned substantially opposite that part of the exterior surface of the collar where the inwardly sloping wall communicates with the exterior surface of the collar, said circumferentially extending sealing lip being adapted to engage the exterior surface of a said removable fluid tight membrane; and
- a top having a cross-section which is substantially the same as the exterior of the flexible header and having openings therein to intimately engage the outer edges of the elongated nipples; and
- means clamping said top end and flexible header into intimate fluid resistant contact with the exterior said housing and forming a plurality of fluid tight axial compression seals between the sealing nipples and a said cable extending therethrough, said housing and said flexible header forming interior fluid tight compression seals therebetween by urging said sealing ridge of the flexible header against a said ring of a fluid tight membrane to form a fluid tight top compression seal between a said fluid tight membrane and a said geophone top and by urging said tapered edge of the collar against the housing to form an intimate fluid resistant seal between the mating sloping walls of the countersink and collar, said collar being tightened against a said fluid tight membrane in response to the sealing edges of the countersink and collar making sealing engagement therebetween to direct the circumferential lip formed around the interior of the collar against the exterior surface of a fluid tight membrane to clamp and form a fluid tight lateral compression seal between the sealing lip, a said fluid tight membrane and exterior of a said geophone forming a fluid tight interior within the fluid resistant enclosure.

8. The enclosure of claim 7 further comprising
- a support mount formed into the closed end of said housing; and
- a spike removably attached to said support mount.

9. The enclosure of claim 7 wherein the interior of the hollowed out central area of the flexible header has a volume and geometrical cross-section to accommodate two take-out knots, one tied in each end of a cable extending through each elongated nipple to the interior of the hollowed-out central area.

10. The enclosure of claim 7 further comprising said housing having a plurality of tapped apertures at the open end thereof and said top is positioned to engage the open end of the housing with the flexible header therebetween and having a plurality of apertures therein in alignment with the tapped apertures in said housing, and wherein said clamping means comprises
- a plurality of screws mounted in the apertures of said top and extending into said tapped apertures, said screws being capable of providing a clamping force as said screws are advanced into said tapped apertures.

11. The enclosure of claim 7 wherein the flexible header is formed of a neoprene compound having a hardness of about 55 durometers on the Shore A scale.

12. The enclosure of claim 7 wherein the fluid tight membrane is formed of a molded neoprene compound having a hardness of about 55 durometers on the Shore A scale.

13. A fluid tight enclosure for a geophone encapsulated in a fluid tight membrane having a ring around the top thereof and cable electrically connected to the geophone comprising a housing having a cavity which is adapted to enclose a said geophone and fluid tight membrane, said housing having an open end for the cavity formed of a counterbore axially aligned with and formed into the cavity terminating in a countersink having inwardly sloping walls;

a flexible header positioned within said housing and having a hollowed out central area and an opening thereto defined by a sealing collar, sealing ridge and tapered edge, said flexible header having cable entry means having an aperture extending therethrough into the hollowed out central area and a plurality of axially aligned annular shaped protrusions formed on the sides of said aperture, said cable entry means being adapted to removably enclose a said cable, said sealing collar being adapted to enclose said fluid tight membrane and having a circumferentially extending sealing lip formed therearound, said tapered edge of the collar mating with the inwardly sloping walls of the countersink;

a top having an interior for enclosing the flexible header and for engaging the cable entry means; and means for applying a clamping force between the top and housing to force the tapered edge into mating contact with the inwardly sloping walls of the housing and the top into clamping contact with the cable entry means and being adapted to form an axial compression seal between the protrusions and exterior of a said cable and to urge the sealing ridge against the ring of a said membrane to form a compression seal between the sealing ridge, the ring of a said membrane, and top of a said geophone and to urge the sealing lip against the exterior of a said membrane to form a lateral compression seal between the sealing lip, a said membrane and exterior of a said geophone.

14. In combination, a geophone having a pair of terminals extending from the top thereof;

a fluid tight membrane having a ring formed around a top opening therein, said membrane encapsulating the geophone and having the ring positioned at the top thereof with the terminals extending through said ring;

a housing having a cavity which encloses the geophone and fluid tight membrane, said housing having an open end for the cavity formed of a counterbore axially aligned with and formed into the cavity terminated in a countersink having inwardly sloping walls;

a cable having electrical conductors adapted to be connected to the terminals of the geophone;

a flexible header positioned within said housing and having a hollowed out central area and an opening thereto defined by a sealing collar, sealing ridge and tapered edge, said flexible header having cable entry means having an aperture extending therethrough into the hollowed out central area and a plurality of axially aligned annular shaped protrusions formed on the sides of said aperture, said cable entry means removably enclosing said cable having the electrical conductors thereof connected to the terminals of said geophone, said sealing collar enclosing said fluid tight membrane and having a circumferentially extending sealing lip formed therearound, said tapered edge of the collar mating with the inwardly sloping walls of the countersink;

a top having an interior for enclosing the flexible header and for engaging the cable entry means; and means for applying a clamping force between the top and housing to force the tapered edge into mating contact with the inwardly sloping walls of the housing and the top into clamping contact with the cable entry means to form an axial compression seal between the protrusions and exterior of the cable and to urge the sealing ridge against the ring to form a compression seal between the sealing ridge, ring and top of the geophone and to urge the sealing lip against the exterior of the membrane to form a lateral compression seal between the sealing lip, membrane and exterior of the geophone.

* * * * *